(12) United States Patent
Barnes et al.

(10) Patent No.: US 11,163,917 B2
(45) Date of Patent: Nov. 2, 2021

(54) MODULAR THREE-DIMENSIONAL TILE SYSTEM

(71) Applicant: Tango Labs, Inc., Brooklyn, NY (US)

(72) Inventors: Margaret Barnes, New York, NY (US); Clement Bellec, London (GB)

(73) Assignee: Tango Labs, Inc., Brooklyn, NY (US)

( * ) Notice: Subject to any disclaimer, the term of this patent is extended or adjusted under 35 U.S.C. 154(b) by 446 days.

(21) Appl. No.: 15/955,434

(22) Filed: Apr. 17, 2018

(65) Prior Publication Data

US 2018/0314768 A1   Nov. 1, 2018

Related U.S. Application Data

(60) Provisional application No. 62/490,061, filed on Apr. 26, 2017.

(51) Int. Cl.
*G06F 30/00* (2020.01)
*G06F 3/01* (2006.01)
*G06F 111/20* (2020.01)

(52) U.S. Cl.
CPC .............. *G06F 30/00* (2020.01); *G06F 3/011* (2013.01); *G06F 2111/20* (2020.01)

(58) Field of Classification Search
CPC ....... G06F 30/00; G06F 3/011; G06F 2111/20
USPC ............................................................ 703/1
See application file for complete search history.

(56) References Cited

U.S. PATENT DOCUMENTS

| 8,465,356 B2 * | 6/2013 | Rosendo | A63F 9/0842 |
| | | | 273/153 S |
| 2012/0122059 A1 * | 5/2012 | Schweikardt | G09B 23/00 |
| | | | 434/118 |

OTHER PUBLICATIONS

Jota_2011 (Constructing Virtual 3D Models with Physical Building Blocks CHI 2011, May 7-12, 2011, Vancouver, BC, Canada). (Year: 2011).*
Brain_Flakes (Customer Reviews Dec. 7, 2017 downloaded from https://www.amazon.com/VIAHART-Interlocking-Educational-Alternative-Childrens/dp/BOON7CD4BK/ref=sr_1_4?dchild=1 &keywords=plastic+connec dated Dec. 7, 2017) (Year: 2017).*
Elenco_Snap_Circuits (Customer Reviews dated Dec. 29, 2016 downloded from Walmart.com toys/learning toys/science & Education) (Year: 2016).*

* cited by examiner

*Primary Examiner* — Brian S Cook
(74) *Attorney, Agent, or Firm* — Boag Law, PLLC

(57) ABSTRACT

A network-based system and method for digitizing an object constructed from physical modular elements using a tangible interface for interacting with a software application. A plurality of modular tiles may be used in a virtual modeling system comprising a rigid substrate portion that is electrically insulating, and a microprocessor embedded in the substrate, which microprocessor is configured to relay information about the tile through the electrical contact. The connection point is shaped to mechanically couple with a corresponding connection point on an adjacent tile, and provide a signal to a base station that may detect various spatial relationships between tiles, which can then be visually modeled on a computing device.

12 Claims, 13 Drawing Sheets

| | key | tileID | connectorID | tileShape | connector refA | connector refB | Center ref |
|---|---|---|---|---|---|---|---|
| Type | Alpha-numeric | Letter code | Integer | 3d file | (x,y,z) | (x,y,z) | (x,y,z) |
| Ex: | EK3 | EK | 3 | triangle.dae | (x,y,z) | (x,y,z) | (x,y,z) |

FIG. 12

MODULAR THREE-DIMENSIONAL TILE SYSTEM

PRIORITY CLAIM

This application claims priority to U.S. patent application Ser. No. 62/490,061 filed Apr. 26, 2017 and titled, "MODULAR THREE-DIMENSIONAL TILE SYSTEM," the contents of which is incorporated by reference in its entirety.

BACKGROUND

Three-dimensional modeling is a process in which a mathematical representation is made of a three-dimensional, real-world object, that may then be displayed in other formats such as on a two-dimensional display using specialized software. The 3D model may then be manipulated, enhanced, studied, or otherwise, in a way that may be impossible or impractical with the physical article. 3D modeling may be useful in the design process to generate digital models before implementation, or to render a digital representation of a mechanical model. 3D modeling may also be valuable in an educational environment, either by stimulating creativity or revealing new perspectives on a construction.

Methods exist for rendering a digital representation of a mechanical model. For example, an image-based computer vision method for geometry acquisition involves acquiring images of the physical article from multiple angles using either multiple stationary cameras or a single camera configured to move around the article. The article being modeled must be kept within the range of the cameras and the resulting 3D model may not capture elements that are not in the line of sight of the cameras. Poor lighting and other environmental factors are also a concern with these methods.

Image capturing methods suffer additional drawbacks not only in limited precision in rendering the physical article, but also inhibiting the creative process by placing a barrier between the physical and the digital. No matter how precise the algorithm or equipment, a user will still need to acquire the images—using one or more camera—and process the images before using the digital article. These steps may inhibit a true seamless interaction between the real world and the virtual one and limit the utility of the digital model.

Similarly, CAD software has been employed for years for creating digital models, often from scratch without a real-world article. Research indicates that over-structured design processes, such as using CAD software in the early stages of design, can inhibit creativity and introduce problems in the design. Circumscribed thinking, premature fixation, and bounded ideation often result from these over-structured environments.

Accordingly, what is needed is a system that eliminates the barrier between physical modeling and virtual or 3D modeling.

What is further needed is a design system that is seamless and does not require a complicated or tedious setup process and/or powerful computing machinery.

What is further needed is a 3D modeling system with enhanced accuracy that is able to reliably render a physical article.

What is further needed is a means for interacting with a 3D model as the physical structure is modified, in real time.

What is further needed is a tool that introduces flexible processes and imaginative tools into children's play, which can be critical to developing imagination and creative problem-solving skills.

BRIEF DESCRIPTION OF THE DRAWINGS

The features and advantages of the present disclosure will be more fully understood with reference to the following detailed description when taken in conjunction with the accompanying figures, wherein:

FIG. 12 shows a sample data structure for storing the data representing a physical model according to embodiments of the present invention.

SUMMARY

Figure 1:
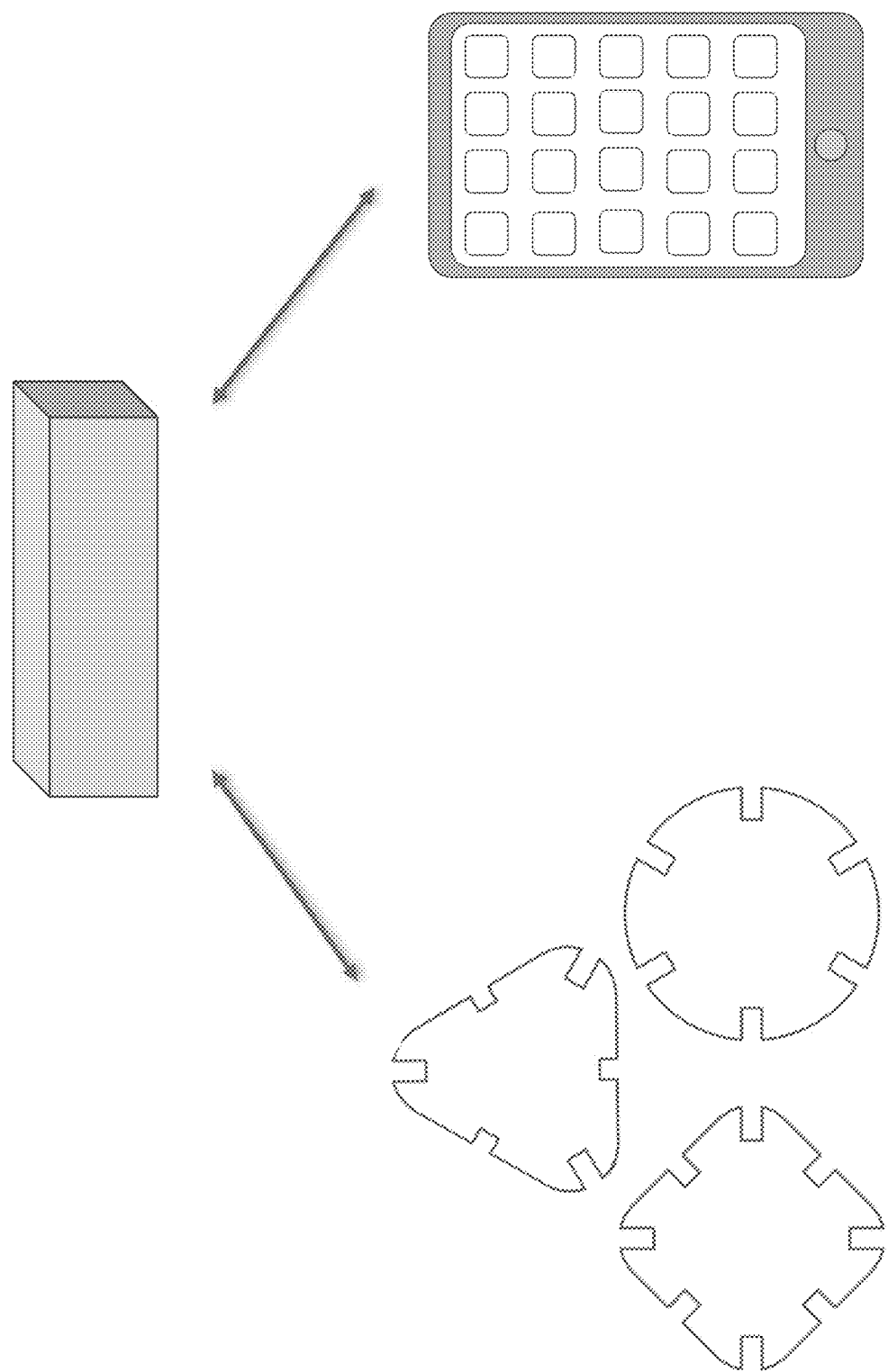
FIG. 1 is a simplified block diagram of an exemplary system that includes a plurality of modular tiles, base structure, and computing device.

A modular tile for use in a virtual modeling system is disclosed comprising a rigid substrate portion that is electrically insulating, having a top side, a bottom side, and at least one edge; a microprocessor embedded in the substrate, which microprocessor is configured to relay information about the tile through the electrical contact; a connection point formed on the at least one edge and connected to the microprocessor, wherein the connection point is shaped to mechanically couple with a corresponding connection point on an adjacent tile; and a connector junction formed in each connection point for forming electrical contact with an electrically conductive surface of an adjacent tile, wherein the connector junction is divided into a plurality of segments such that contact between the connector junctions and the connector junction on an adjacent tile facilitates a signal indicating the presence of the connection and the relative position and orientation between the tile and an adjacent tile.

In further embodiments, a modular virtual modeling system is disclosed, comprising a network of modular tiles, each tile having: (a) rigid substrate portion that is electrically insulating, having a top side, a bottom side, and at least one edge; (b) a connection point formed on the at least one edge and connected to the microprocessor, wherein the connection point is shaped to mechanically couple with a corresponding connection point on an adjacent tile; (c) a connector junction formed in each connection point for forming electrical contact with an electrically conductive surface of an adjacent tile; and (d) a microprocessor embedded in the substrate that configured to relay information about the tile through the electrical contact; a base configured to mechanically attach to at least one modular tile aggregate data from the network of modular tiles and transmit that data via a wireless connection to a computing device; wherein the base is configured to poll the components of the network of modular tiles to: (a) identify all nodes in the network; and (b) identify all connections and orientations between modular tiles in the network to populate a data structure than can be transmitted to the computing device for display.

In embodiments, the connector junction is flip invariant, or divided into a plurality of segments such that contact between the connector junctions and the connector junction on an adjacent tile facilitates a signal indicating the presence of the connection and the relative position between the tile and an adjacent tile.

In embodiments, the connection point is configured such that mechanical coupling with an adjacent tile permits a single orientation relative to an adjacent tile. In embodiments, the modular tile comprises a plurality of retention features used to enhance a mechanical connection with an adjacent tile. In further embodiments, the rigid substrate portion of the modular tile has a cross section that is one of polygonal, circular, elliptical, triangular, and oblate.

In embodiments comprising a base, the base is adapted to receive data representing the connections among the network of modular tiles and represent that data in a data structure for transfer to the computing device, or to communicate a visual representation of the network of modular tiles to the computing device in real time and to adapt to changes in the network of modular tiles as they occur. In embodiments, the base further comprises a power supply that is used to power the network of modular tiles.

DETAILED DESCRIPTION

A network-based method for digitizing an object constructed from physical modular elements is described in which a new type of tangible interface for interacting with a software application is provided.

Referring to FIG. 1, a plurality of modular tiles 110a, 110b, ... 110n may be provided, each comprising a simple geometric shape, and each configured to join an adjacent tile. A microprocessor may be provided in each tile 110 in communication with one or more connectors on each tile 110 that provide both a mechanical connection and an electrical connection to adjacent tiles. When connected, the microprocessors in each tile are able to communicate via the connector(s) to form a network of microprocessors that can communicate with each other. The connector ensures that this process remains invisible to the user, who doesn't have to think about how to connect the tiles beyond their obvious physical shapes. The whole process provides an efficient, fast and hassle-free way to acquire the geometry of the structure and send it over to the software application.

A base structure 120 may be provided to power the structure and relay signals to and from a computing device 130. A software application on the computing device may interact with the base to acquire the precise layout of the modular tiles and provide a 3D representation on the computing device.

Tile

Figure 2B:
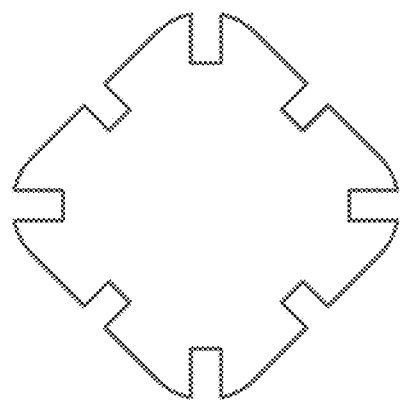
FIGS. 2a-2c illustrate exemplary variations of a modular tile for use with embodiments of the present invention.
Figure 2C:
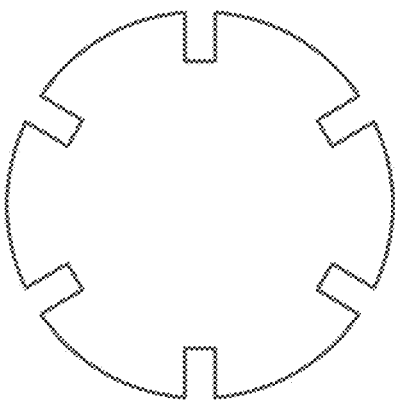
Figure 2A:
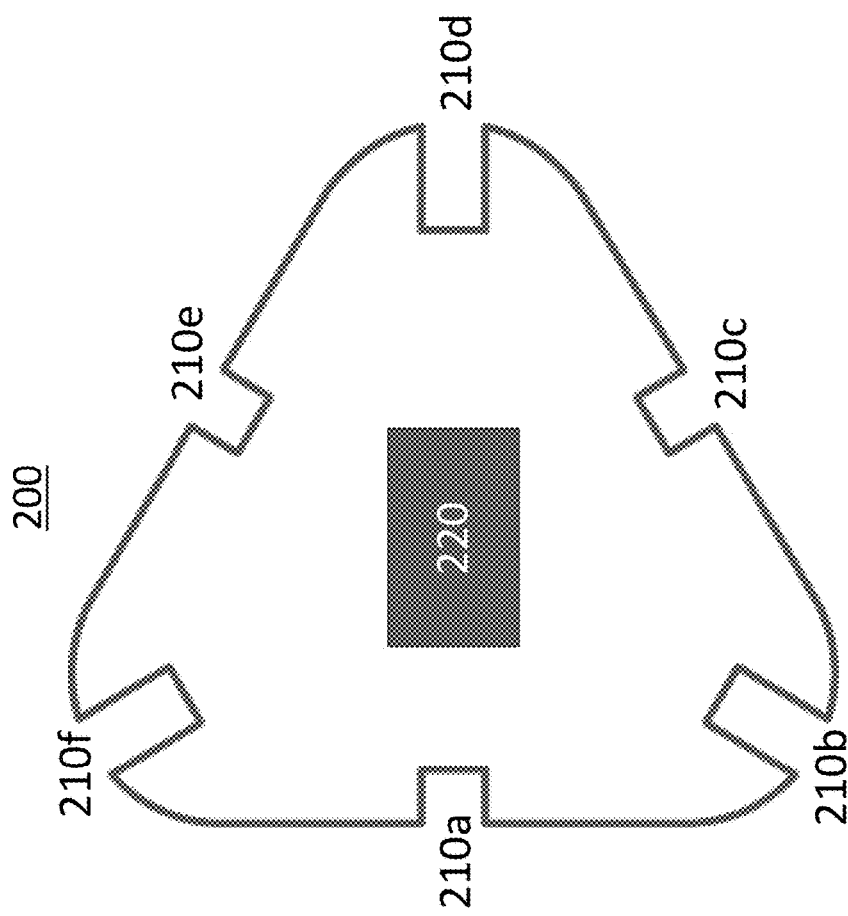

Referring to FIG. 2a, an exemplary modular tile 200 is shown. In embodiments, modular tiles 200 are the base elements of the system and may take any size and shape suitable for the intended application. FIG. 2a shows a modular tile in a generally triangular shape with connector means 210a-210f formed therein for connection to adjacent tiles. FIG. 2b shows an alternate modular tile formation with a generally square configuration, while FIG. 2c shows a modular tile with a generally circular configuration. A wide variety of shapes are contemplated as coming within the scope of the invention and may include modular tiles that are polygonal, circular, elliptical, oblate, and the like. The overall dimensions may likewise vary, with smaller modular tiles for more precise applications such as architecture or structural engineering, and larger tiles for other applications such as education or play. Further, modular tiles for use with the present invention need not have any particular symmetry or proportion. While the modular tiles shown in FIGS. 2a-2c (and elsewhere herein) may be generally symmetrical along an X- or Y-axis, this symmetry is exemplary only and the tiles may take varied shapes.

A microprocessor 220 may be provided in each tile to manage communication with other modular tiles and the base, and also to hold a unique identifier for each tile.

In embodiments, the varied shapes of the modular tiles are simple geometric forms that are abstract and encourage creativity or free play. Shapes utilized with embodiments of the present invention may facilitate a user's modeling of real world objects. For example, the circular form of FIG. 2c may suggest a wheel, while the square of FIG. 2b may suggest a more symmetric structure such as a building.

As will be discussed below, the position and size of the connector means in the modular tiles may allow tiles to be joined to form three-dimensional models of varying complexity, which may be modeled on a computing device.

Figure 3A:
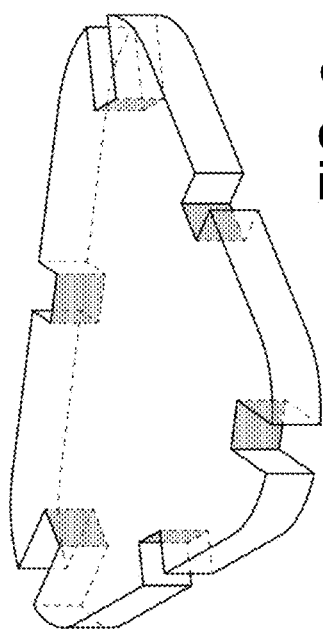
FIGS. 3a-3c illustrate the interconnection between modular tiles according to embodiments of the present invention.

Referring to FIG. 3a, an embodiment of a tile is shown in perspective view with connector means formed therein. In embodiments, each tile may consist of two types of surfaces, namely, an electrically conductive surface and an electrically insulating surface. In the example of FIG. 3a, the electrically insulating surfaces are shown in white, and the electrically conductive surfaces are shown with hatching.

The hashed areas represent a possible layout for the conductive surfaces, which would be in the form of a metallic layer. In this layout, the number of conductive surfaces per tile is equal to the number of nodes per tile.

In embodiments, tiles may be formed from an electrically insulating material such as a polymer that can be molded with a recess to accommodate electronics and leads to the electrically conducting regions of the tile.

In a preferred embodiment, each tile has a hollow body, consisting of an electrically insulating plastic material, with side walls, and a top and bottom wall, which are perpendicular to the side walls.

As an alternative to polymers, any generally electrically insulating material may be used, with electrically conducting regions formed thereon. For example, glass, rubber, paperboard, ceramic, and wood, among others, could be employed as the electrically insulating region. Where a recess for the electronics cannot be formed in the tile material, the electronics may be affixed to the exterior of the tile.

In embodiments, modular tiles may be treated or coated to provide additional variations. For example, modular chips may be provided in an array of colors, or differing textures to enhance the creative value of the system, or enhance enjoyment. Coatings may be applied for functional considerations, such as to enhance the friction between two modular tiles.

In embodiments, the intended application may influence the choice of materials. For example, whether tactile softness is a desired attribute versus tactile warmth is a consideration. A lighter weight material (and lighter tile) may be desired, but may also reduce abrasion resistance. Stiffness may be desired for some applications, and resilience for others. Cost, the intended use, the target user, and other factors may all influence the choice of materials.

Similarly, mechanical attributes (El. modulus, Yld. strength, Tensile strength, Comp. strength, Elongation, Toughness, Fatigue Limit, Hardness) may factor, as may thermal attributes (Max use temp., Th. conductivity, Th. expansion, Molding temp.) or electrical attributes (Dielectric constant, Dielectric loss, Resistivity).

In embodiments, the leads incorporated within the tile are dimensioned, configured and positioned so that when the tile is frictionally engaged with another tile, electrical connection of the leads of one of the tiles will be established with the leads of the other. A mechanical connection may ensure the reliability of the electrical contact made.

Figure 3C:
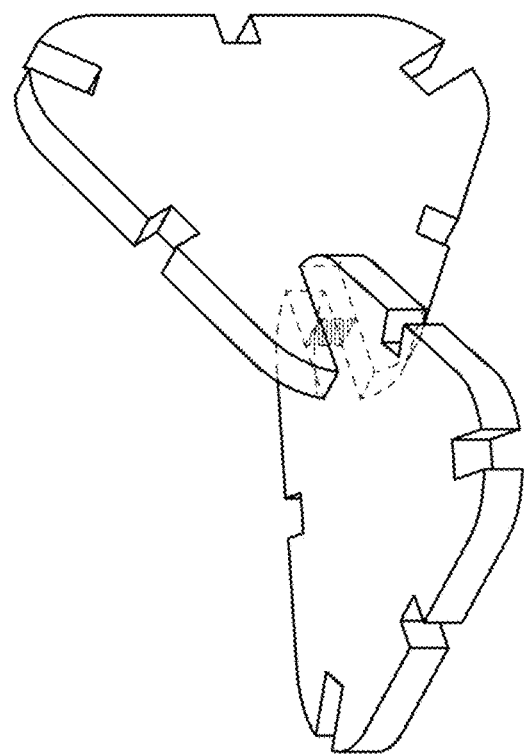
Figure 3B:
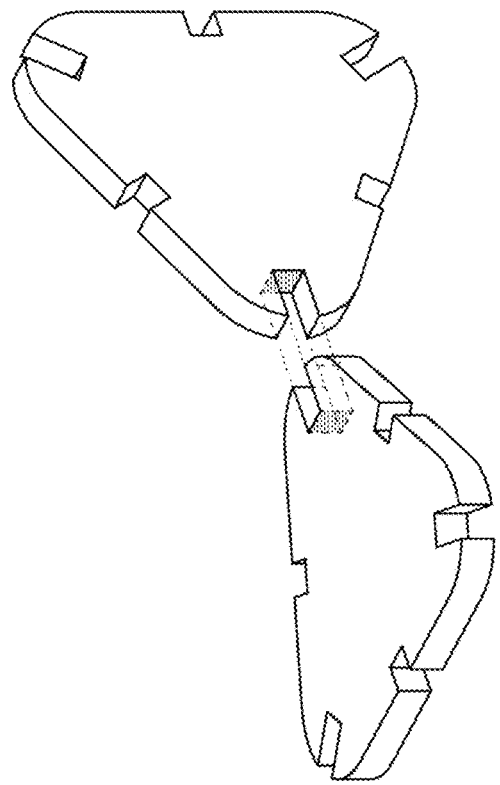

FIG. 3b shows two adjacent tiles in an embodiment of the invention, before mechanical coupling. A node with an electrically conductive surface on one tile must come into contact with a node with an electrically conductive surface on another tile in order to form a connection. The tiles are shown oriented at a 90-degree angle along the Y-axis so that the solid surfaces within each node align with the open areas of the opposite node.

When pressed together, as shown in FIG. 3c, the electrically conductive surfaces have been joined to the adjacent regions of each tile. In embodiments, the height of the notch may be slightly smaller than the thickness of the tiles to achieve a true interference fit. As discussed above, the materials used for the modular tiles may also be chosen to enhance the strength of the union between modular tiles.

Figure 4A:
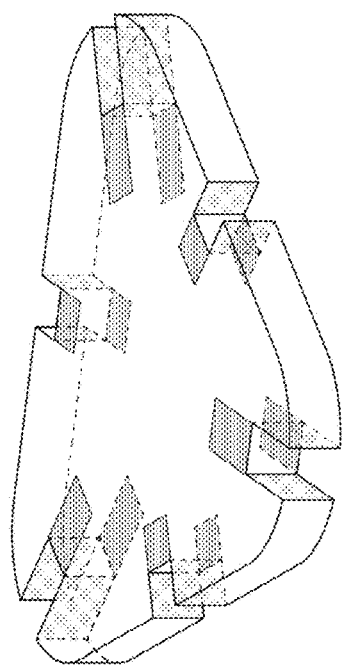
FIGS. 4a-4c illustrate an alternate interconnection between modular tiles according to embodiments of the present invention.
Figure 4C:
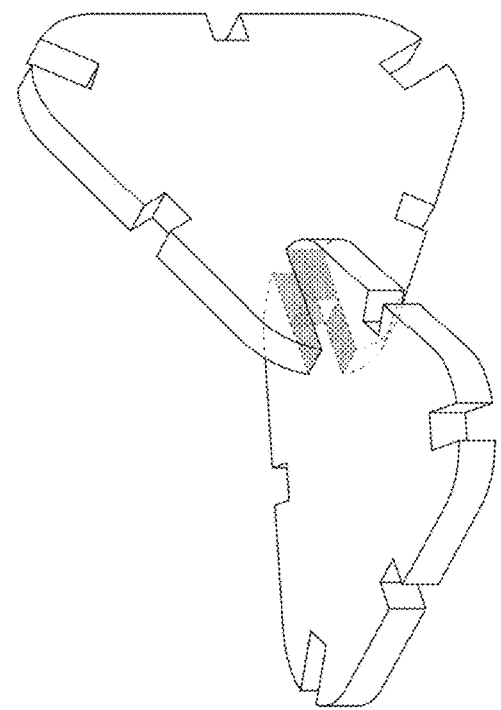
Figure 4B:
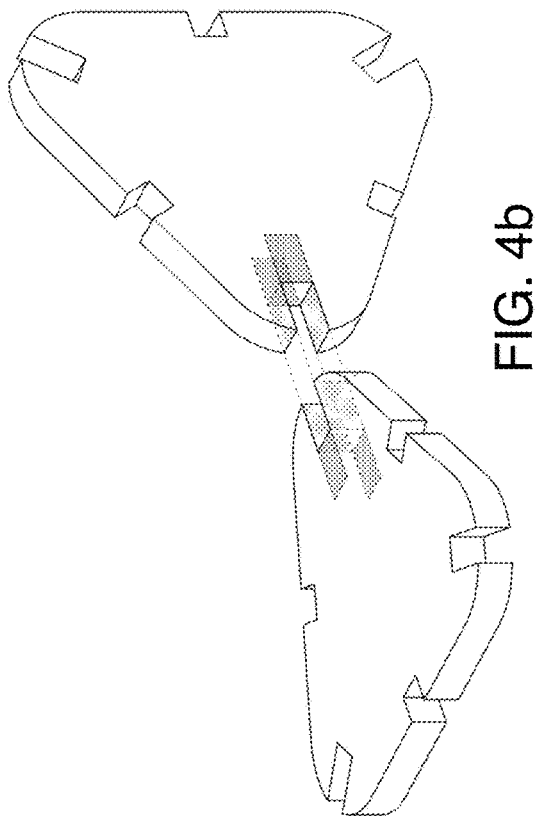

FIGS. 4a-4b show an alternate layout for the electrically conductive surfaces of the tile. Here, dotted areas and hatched areas represent the conductive surfaces in the form of a metallic layer. Here, the number of conductive surfaces per tile is equal to four times the number of nodes per tile. In this layout, the dotted conductive surfaces of one tile make contact with the hatched conductive surfaces of a second tile. When the two tiles are fully coupled together mechanically, the eight conductive surfaces (four per tile) overlap to form the regions shown in FIG. 4c.

It should be noted that the surface area of each conductive region will depend on the number of electrical contacts that need to be established and does not necessarily need to be equal to the surface area of the side of the node. Only a portion of the dotted regions and hatched regions may need to be conductive.

Figure 5B:
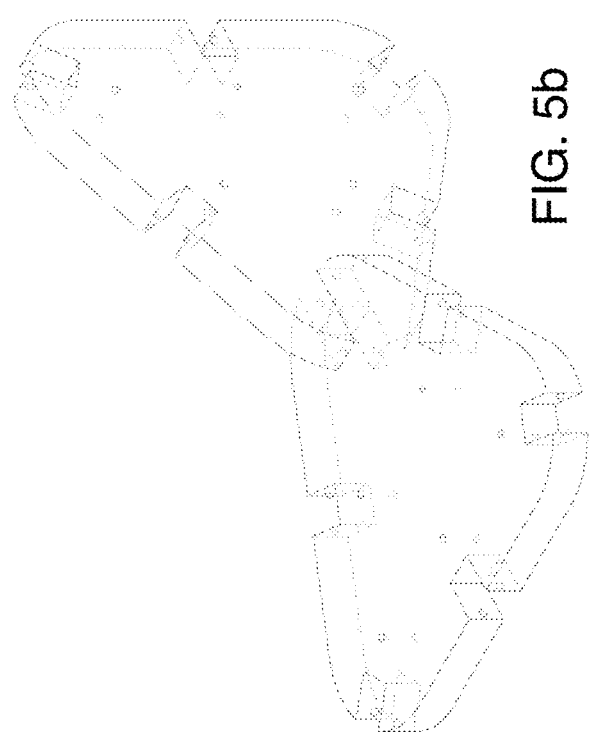
FIGS. 5a-5c illustrate a further alternate interconnection between modular tiles according to embodiments of the present invention, in which retention features are used to enhance the mechanical connection between the tiles.
Figure 5C:
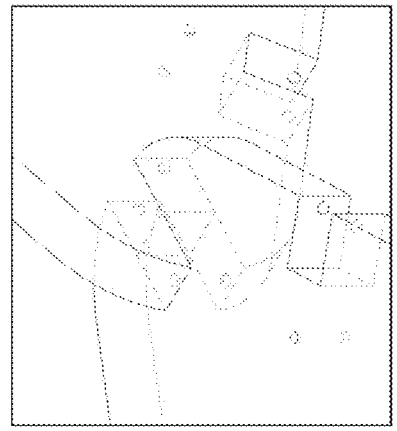
Figure 5A:
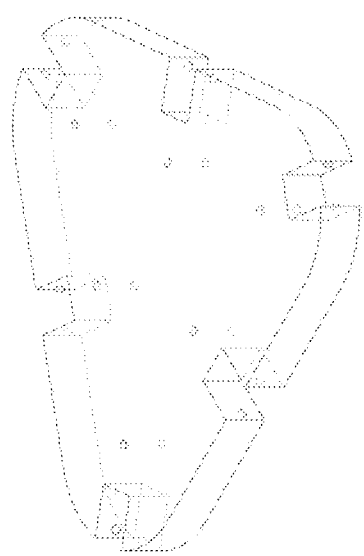

FIGS. 5a-5c show a further alternative embodiment for the modular tiles, in which retention features are used to enhance the mechanical connection between tiles. In the illustrated embodiment, the retention features are semi-sphere indentations on the top and bottom surfaces of the tile. The retention mechanisms are the semi-sphere protrusions on the side surfaces of each node.

The retention features depicted are shown as having female mating characteristics, and the retention mechanisms are shown as having male mating characteristics. When the tiles are coupled, the male characteristics are moved into the female characteristics. This is just one embodiment, as the retention features are adapted to engage with retention mechanisms and can be widely varied. For example, the retention mechanism(s) may be springs that include a surface that fits within the indentations, spring loaded detents, or similar latching mechanisms. In other embodiments, other retention mechanisms can be used such as magnetic latches or orthogonal insertion mechanisms.

In this depiction, there are two retention features and two retention mechanisms per node. These are part of a retention system that include two features on the first tile that are adapted to engage with two mechanisms on the second tile to secure the connectors together when the tiles are intercoupled.

Additionally, the retention system can be designed to accommodate different insertion and extraction forces to allow for both a stable electrical connection and relative ease in decoupling the tiles.

In addition to evaluating which contact points are aligned between two tiles, the shape of the tiles and the intended application may require that the relative orientation between two tiles be determined. In embodiments where a connection means between two tiles is flip-invariant, two tiles joined at a contact point can still exhibit two possible orientations relative to one another, complicating or even precluding the modeling of the structure on the computing device. FIGS. 6a-6d demonstrate this condition.

Figure 6A:
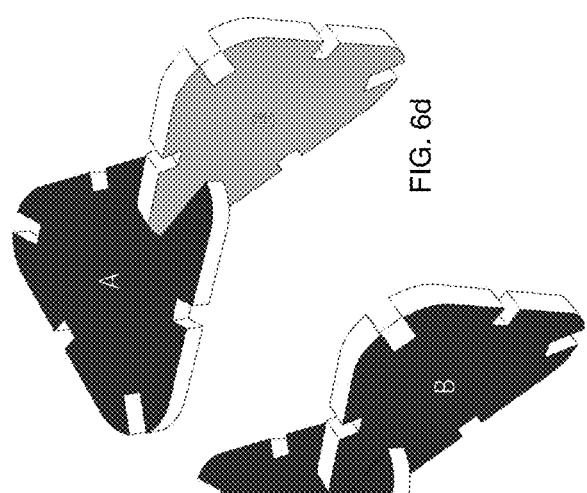
FIGS. 6a-6d illustrate the possible spatial relationships between two adjacent tiles joined at a single connection point.
Figure 6B:
Figure 6C:
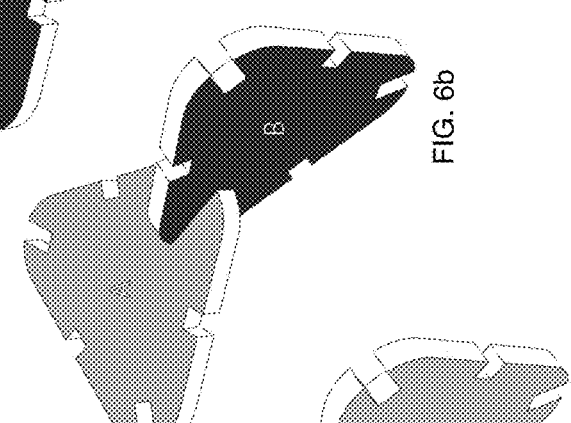
Figure 6D:
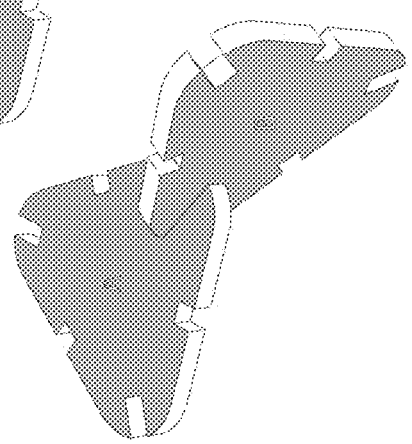

FIGS. 6a-6d each show the same two tiles having a light side and a dark side. (The shading of these tiles is for illustration purposes and need not be reflected in the physical tile.) In each of FIGS. 6a-6d the tiles are shown as connected at the same contact point. FIG. 6a shows tile A with the light side facing up and tile B with the light side facing left. FIG. 6b shows the same two tiles, again with the light side of tile A facing up, but this time with the dark side of tile B facing left. Although the same point of contact is made between the adjacent tiles, tile B has been rotated 180 degrees. Referring to FIG. 6c, the dark sides of tile A and tile B are facing up and left, respectively and although the same point of contact has been maintained, tile A has been rotated 180 degrees drawing. Continuing the rotation of tiles, FIG. 6d shows tile A with the dark side up, and tile B with the light side facing left.

Figure 7A:
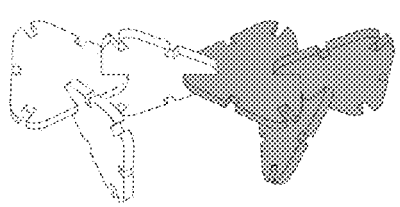
FIGS. 7a-7b illustrate two chiral structures each joined at identical contact points but varying in composition.
Figure 7B:
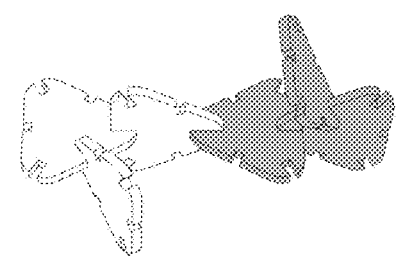

In such a configuration, detecting only the contact point may omit valuable information about the shape of the structure. Referring to FIGS. 7a-7b, two structures are shown, each comprised of three-tile sub-structures, one light and one dark, joined at identical contact points. However, in FIG. 7b the dark sub-structure is flipped 180 degrees as compared to FIG. 7a, and as a result the structures in FIGS. 7a-7b are different (non-superimposable). Structures exhibiting this geometric property known as chirality lack an axis of symmetry and are particularly susceptible to these types of variations.

Figure 8B:
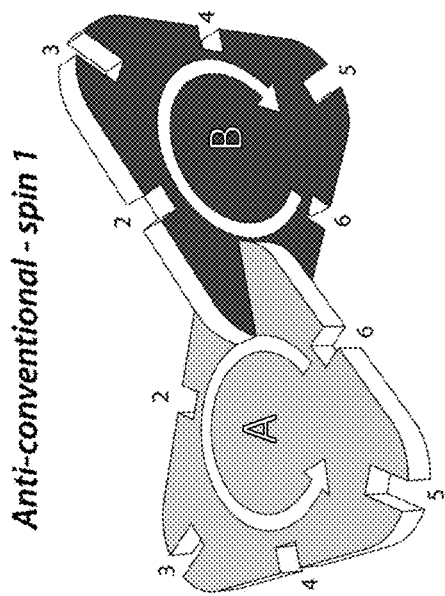
FIGS. 8a-8b illustrate the spin characteristic of two discrete tile structures.
Figure 8A:
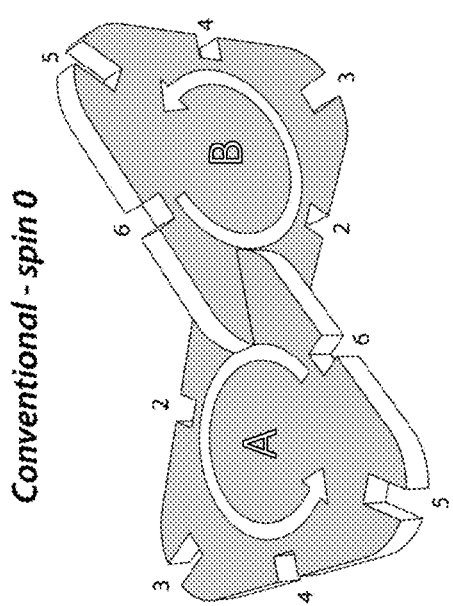

In embodiments, the "spin of two tiles may thus be monitored along with the point of contact. FIGS. 8a-8b describe a logical mechanism for assessing the relative orientation of two adjacent tiles, known as the spin between the tiles. The concept of spin is an arbitrary description for determining the orientation of tiles and may be necessary for determining which way the tiles are facing.

Similar to FIGS. 6a-6d, FIGS. 8a-8b each show a condition in which two tiles are joined at a connector means. The left-side tile in each of FIGS. 8a-8b remains the same while the right-side tile has been rotated 180-degrees from FIG. 8a to FIG. 8b to expose the alternate side. As discussed above, this can result in the undesirable condition where the system is not accurately modeled.

In embodiments, tiles may be flip-invariant such that two tiles can be joined by a user without regard to a specific orientation. Such a configuration may be desirable where ease of use is important since the user need not position the tiles in a specific manner in order to make the connection. In embodiments where flip-invariance is employed at the user level, asymmetry at the hardware level may be necessary to distinguish the spin condition. The microprocessors of each tile may use this asymmetry to determine the spin of the structure.

In embodiments, an arbitrary spin condition may be defined, as shown in FIGS. 8a-8b. FIG. 8a demonstrates a connection between tile A at connection point 1 and tile B at connection point 1. This condition is referred to in embodiments as spin 0 or conventional spin. Referring to FIG. 8b, the tiles are joined at the same connection points, and tile B has been rotated 180 degrees. This condition is referred to in embodiments as spin 1 or anti-conventional spin. The concept of spin is meant to be exemplary only and the specific labels or values assigned to the tile orientations are largely arbitrary. While it may be important in embodiments to track the relative orientation of tiles, there are myriad ways of accomplishing this.

Figure 9:
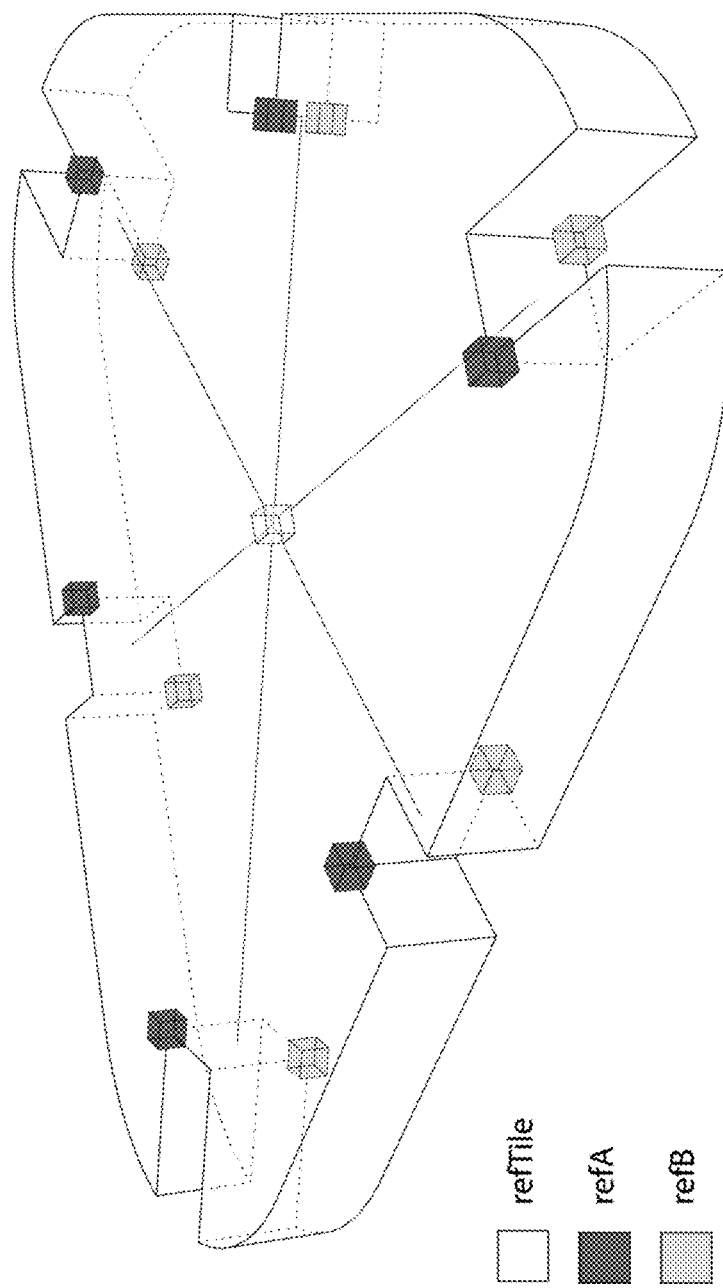
FIG. 9 illustrates a simplified implementation of a connector capable of monitoring the spin of adjacent tiles for use with embodiments of the present invention.

FIG. 9 shows a simplified implementation of a connector capable of monitoring the spin of adjacent tiles. As shown in FIG. 9, a tile may be provided with a plurality of notches for facilitating a mechanical connection with an adjacent tile.

Electrical connectors may be provided in or adjacent each notch such that contact between connectors on adjacent tiles facilitates or generates a signal indicating the connection. In embodiments, in order to match the tiles appropriately, two points may be defined on each notch: "A" and "B". When the tiles are assembled with spin equal to 0, the points A and B of each notch will match. When the spin is equal to 1, points A will be matched with points B.

In this simplified implementation, the asymmetry at the hardware level remains invisible to the user, but the software is still able to understand how two tiles are positioned with regards to one another.

Figure 10A:
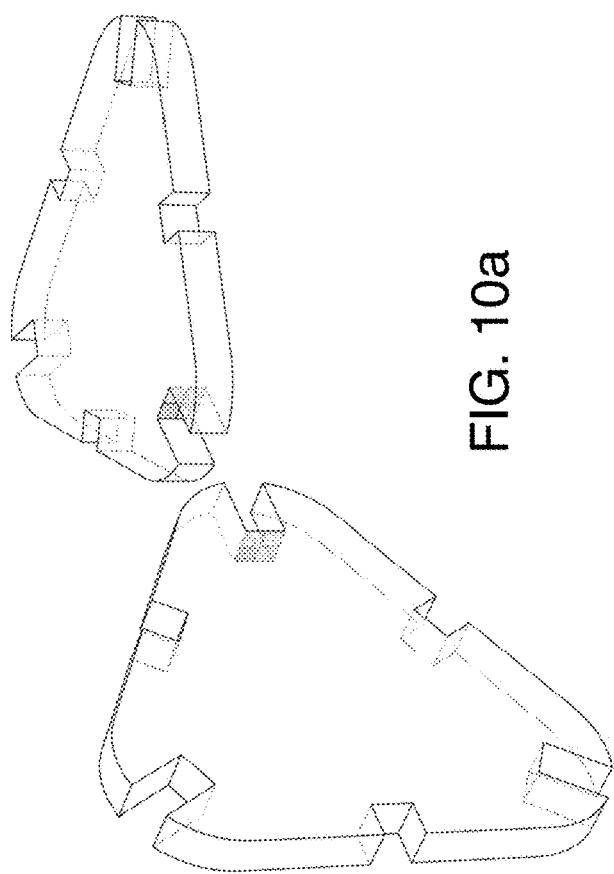
FIGS. 10a-b show an expanded view of a connector for use with embodiments of the system.
Figure 10B:
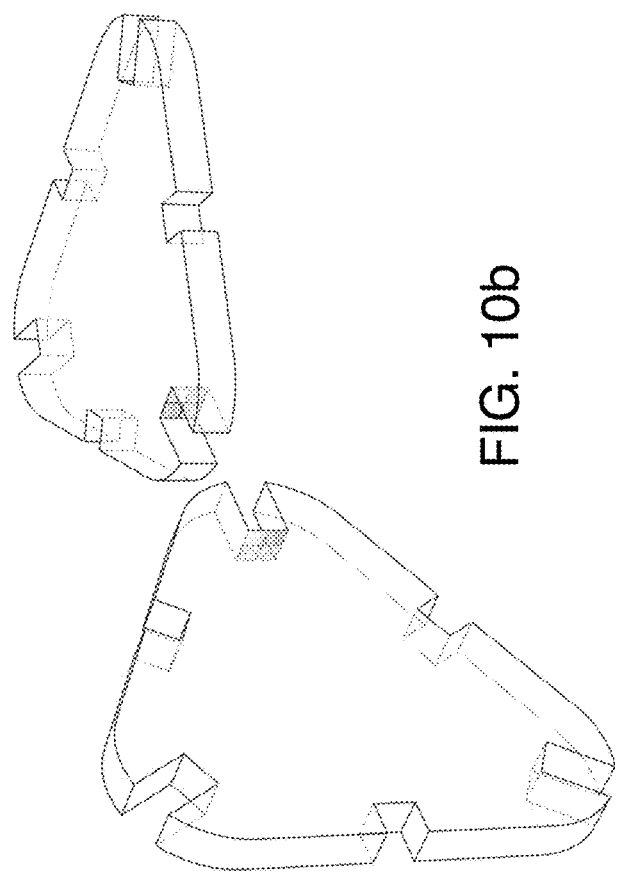

FIGS. 10a-b show an expanded view of a connector for use with embodiments of the system. By dividing the point of contact into quadrants and assessing which two quadrants have made contact, the connector is able to determine that a connection has occurred and the relative orientation of the two tiles. In embodiments, software may be able to determine the difference between the two configurations and orient them correctly in space.

In embodiments, the connection between tiles and assessment of orientation enable modeling the structure, first in a data structure and then visually.

Figure 11C:
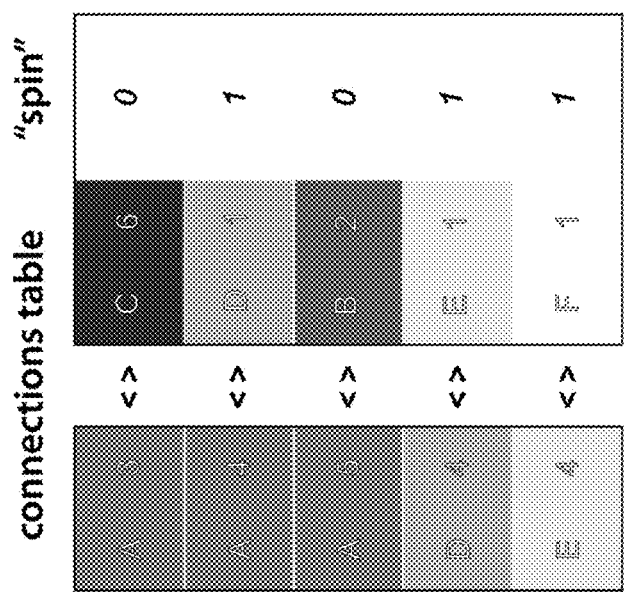
FIGS. 11a-c show a sample physical structure, a logical modeling of that structure, and a connections table for representing the physical structure.
Figure 11B:
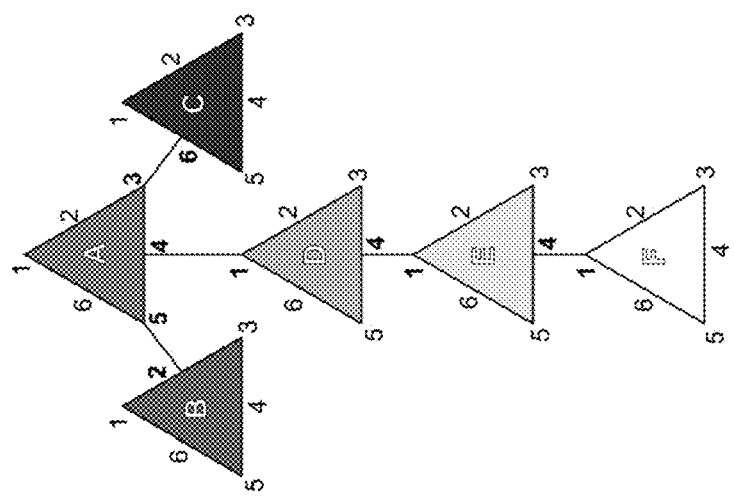
Figure 11A:
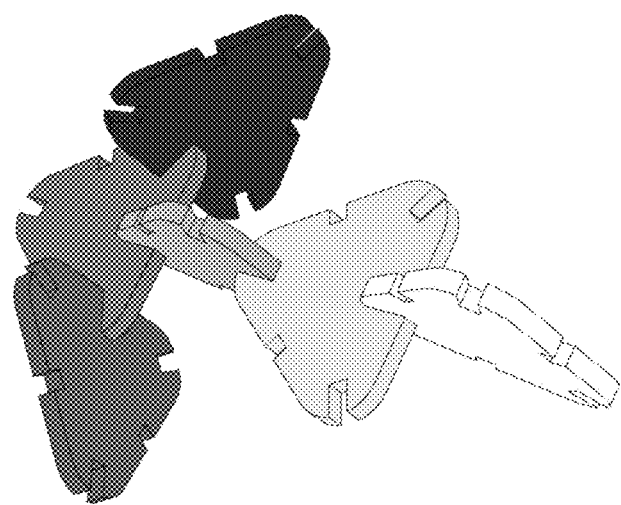

FIG. 11a shows a rendering of a sample physical structure created with six tiles, each tile having six connector means for engaging adjacent tiles. FIG. 11b shows a logical modeling of the structure of FIG. 11a. The point of contact between tiles A and B is connector number 5 on tile A and connector number 2 on tile B. Tile A is also connected to tile D at its connector number 4, which interfaces with connector number 1 of tile D. Tile A is further connected to tile C, and tile D is further connected to tile E, which is in turn connected to tile F.

These connections can then be stored in the connections table shown in FIG. 11c. In embodiments, a connections table may store points of connection between tiles. In the example shown in FIGS. 11a-11c, a connections table may contain fields for contact pairs as shown, e.g., A-3 connecting to C-6. In embodiments where spin is also evaluated, a field may be provided for the spin between each contact pair, as shown.

The data structure used to store the contact pairs may vary. In one embodiment, a database structure may be used, as shown in FIG. 12 with each row in the database corresponding to a connection point between two tiles. The specific fields listed in FIG. 12 are meant to be exemplary only and a wide variety of possible fields elements may be utilized with embodiments of the invention.

When the application receives the table of connections from the base, it will be able to reconstruct the structure by querying the database to find the appropriate pre-stored tile 3D assets, and insert them at the right position and orientation.

In alternate embodiments, other data structures may be employed such as a graph data structure in which the unique identifier of each modular chip represents a vertex, and each link with an adjacent chip represents an edge.

Base

A centralized base may support an array of joined modular tiles and provide processing and communication means to facilitate the rendering of the structure on a computing device. In embodiments, a centralized base provides power to the tiles and connection to the application. By incorporating a centralized base, the functions of powering and interfacing with the application may be offloaded from the tiles themselves, simplifying the design.

In embodiments, a base may be configured to aggregate data from the network of modular tiles and transmit that data via a wireless connection to the computing device. In one embodiment, a microprocessor in the base may poll the components of the network to: (1) identify all nodes in the network; and (2) identify all connections in the network to populate a data structure than can be transmitted to the software application. Alternatively, raw data collected from the network may be collected by the base and sent to the software application for further processing.

In embodiments, power to the system may be supplied either through an internal battery or by connection to a standard wall outlet. Voltage and other electrical specifications may take into consideration the needs of the system, including larger constructions with numerous tiles that might overburden a limited power supply.

In one embodiment, a wireless technology, such as Bluetooth or Wi-Fi, could serve as a means to connect the base to the application. In another embodiment, a direct connection from the base to the device, such as a USB cable, could provide a more reliable and more energy efficient way of connecting to a desktop computer when appropriate. It could also provide power to the tiles, provided the power is sufficient.

In embodiments, a series of connectors may be provided on the surface of the centralized base onto which modular tiles may join. Where the first tile(s) in a construction is/are joined to the base, connectors may be provided that, in a preferred embodiment, avoid limiting the possibilities of construction by imposing particular connection points or angles between the tiles and the centralized base. In embodiments, a plurality of initial connectors may be provided at different fixed angles on the base or, alternatively, by having one or more connector(s) mounted on a rotating system.

In embodiments, connection between a structure or tiles and the base may be by one or more connector mechanisms similar to the mechanism provided for joining individual tiles. In embodiments, provision may be made for the structure or tiles to be connected to the base at an angle to provide greater flexibility to the user.

Several form factors for a centralized base are contemplated as coming within the scope of the invention including, for example, a box, a rolling mat, and a flat board, among others.

A centralized base may serve additional purposes and provide additional functions to the system.

In embodiments, a base may incorporate a joystick, touchpad, slider, button or other controller for directing the movement of the structure, either virtually on the computing device or mechanically. In embodiments, a base may be configured to rotate, tilt, lift, descend, and so forth in response to user input. For instance, a slider could control the color of the digital model, while a joystick could be used to rotate it.

In embodiments, a base may be configured with a recess for storing the modular tiles when the system is not in use. Depending on the nature of the modular tiles, the recess may be shielded to prevent interference with or interaction with any tiles in the storage container.

Software

Figure 13B:
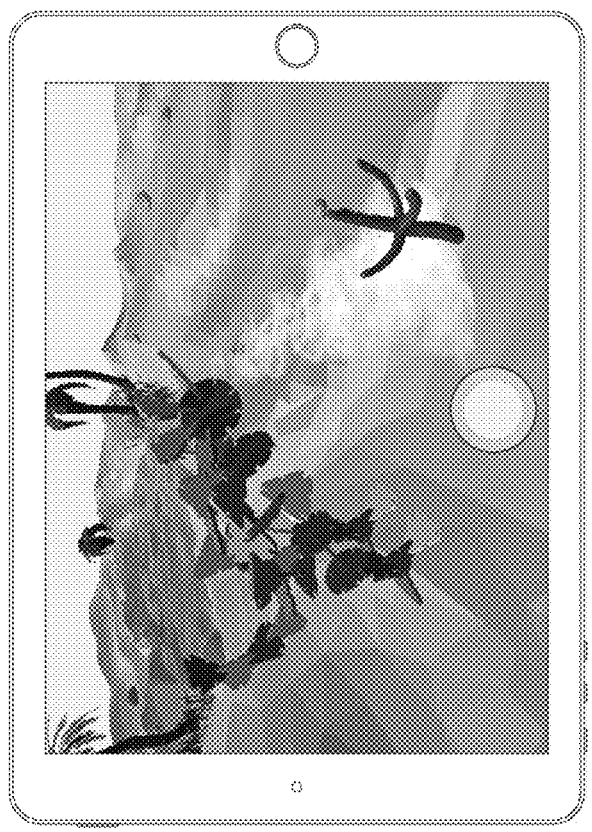
FIGS. 13a-13b show an exemplary user interface for a software application used with the present invention.
Figure 13A:
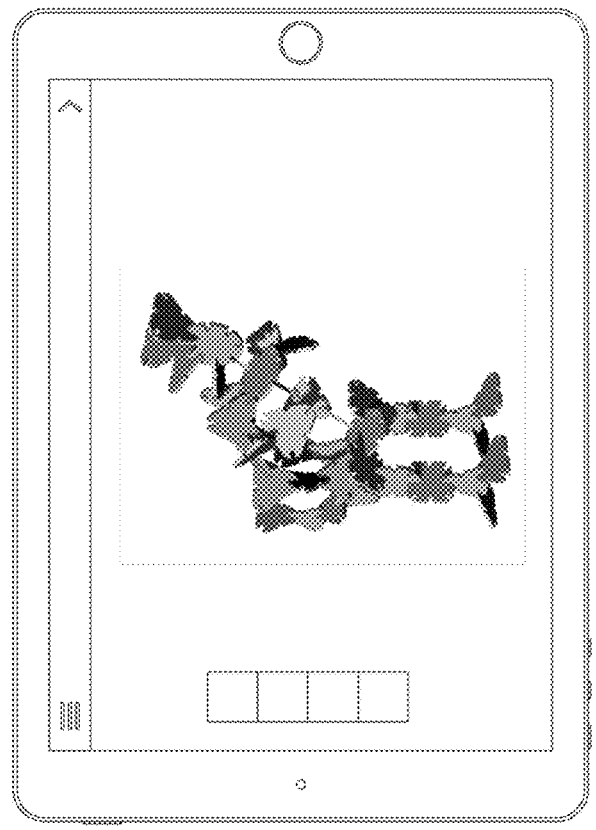

Referring to FIGS. 13a-13b, an exemplary user interface is shown for a software application. The software is able to query the base and receive information on the structure and can acquire the precise layout and organization of the network (what tile is connected to what tile, and what notches they are connected through) so as to recreate a 3D-model of the structure. FIG. 13b shows the 3D-model in an exemplary virtual environment.

Figure 14:
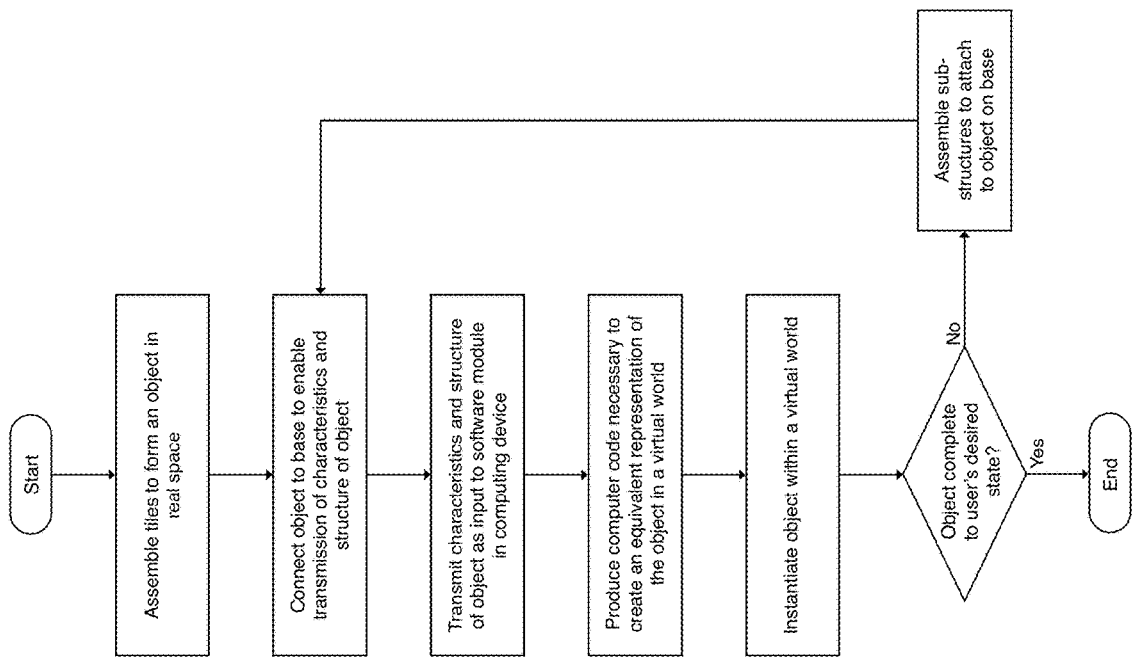
FIG. 14 shows a flowchart describing a sample user interaction with the system hardware and the software application.

Referring to FIG. 14, a flowchart is shown describing a sample user interaction with the system hardware and the software application.

Case Studies

Sample usage cases are described below. These usage cases are intended to show example environments where the invention may be applied, and are not intended to be limiting or describe all possible environments for the invention.

In one environment, a young child interacts with the system in a home environment where he is playing a game application on a tablet computer. Utilizing an embodiment of the present invention, the child is able to creatively design a creature for use with the game by assembling the geometrically-shaped tiles. After trying several combinations, the child decides that the three triangular tiles and one circular tile he has assembled together actually look like a dinosaur head. The child builds out the rest of the dinosaur and places it on the base. Instantly the dinosaur appears on the tablet: The child tests out different shades of green and adds a scaly texture. After adding these characteristics, he decides to add a long and sophisticated tail, which he assembles and then attaches to the dinosaur that is already connected the base. When the tail is attached, the child sees the dinosaur on the tablet update to include the new tail. He then chooses to place his dinosaur in a desert-like virtual environment and give it some abilities: walking by moving its legs and breathing fire on command. The child likes his dinosaur so he saves his scene, which includes the dinosaur as an asset. He can now disassemble the tiles and move on to building the next character of his story: a space robot to help the dinosaur take over the desert. The embodiments created by the child are saved in the system for later use in the game application environment.

In a second environment, a designer who specializes in custom lighting fabrication has been commissioned to create a custom fixture for a client. The designer may use a professional-grade embodiment of the invention—with a more complex form factor, differently-sized tiles, and more complex software—to create a chandelier. By assembling tiles and manipulating the small-scaled model of the chandelier, she is able to look at it from every angle in a very natural way, and "feel" it coming into shape, as the tiles allow her to retain the tactile experience of model manipulation. When she is satisfied with the results, she connects her structure to the base and imports the design into her CAD software of choice. Using the application of an embodiment of the present invention, the CAD software recognizes the salient features of the chandelier and renders a mesh network that matches the design intent expressed by the physical tiles. The designer now has a foundational three-dimensional model to build from, as she explores interesting geometric details, different material components and other design specifications.

In a third environment, a teacher is giving an "Introduction to Engineering Design" lesson to his tenth-grade students. The assignment is to create a 1:100 model of a bridge that spans 200-feet across a lake and compare the design choices for structural integrity. The students, in teams of four, work with a set of tiles that include triangles, squares and circles. The students must make decisions about the costs and benefits of using certain shapes for each part of the bridge (e.g. choosing to use triangles instead of squares for the trusses of the bridge given the inherent structural characteristics of triangles). The bridges take many shapes and forms. At the end of the session, all the bridges are connected to the base and imported into a purpose-made application for this lesson. A three-dimensional model is extracted for each and a finite element calculation analysis highlights the weaknesses of each structure and the theoretical maximum load they can bear, if any. The teacher is able to walk the students through some of the information from the structural analysis and explain the findings in relation to the physical models the students built. To end the session, the teacher tests each of the bridges constructed of tiles by laying a mat on the deck of each bridge and rolling a five-pound miniature truck across the structure. As predicted by the application, the bridges that are structurally unsound don't sustain the miniature truck, while those that are structurally sound survive.

It will be understood that there are numerous modifications of the illustrated embodiments described above which will be readily apparent to one skilled in the art, including any other combinations of features disclosed herein that are individually disclosed or claimed herein, explicitly including additional combinations of such features. It is noted, as is conventional, the use of a singular element in a claim is intended to cover one or more of such an element.

We claim:

1. A modular tile for use in a virtual modeling system, comprising:
    a rigid substrate portion that is electrically insulating, having a top side, a bottom side, and at least one edge;
    a microprocessor embedded in the substrate, which microprocessor is configured to relay information about the tile through the electrical contact;
    a flip-invariant connection point formed on the at least one edge and connected to the microprocessor, wherein the connection point is shaped to mechanically couple with a corresponding connection point on an adjacent tile;
    a connector junction formed in each connection point for forming electrical contact with an electrically conductive surface of an adjacent tile, wherein the connector junction is divided into a plurality of segments such that contact between the connector junctions and the connector junction on an adjacent tile facilitates a signal indicating the presence of the connection and the relative position, orientation, and spin between the tile and an adjacent tile; and wherein the modular tile is configured to receive a power supply from an associated base structure.

2. The modular tile of claim 1 wherein the connection point is configured such that mechanical coupling with an adjacent tile permits a single orientation relative to an adjacent tile.

3. The modular tile of claim 1 further comprising a plurality of retention features used to enhance a mechanical connection with an adjacent tile.

4. The modular tile of claim 1 wherein the rigid substrate portion has a cross section that is one of polygonal, circular, elliptical, triangular, and oblate.

5. A modular virtual modeling system, comprising:
a network of modular tiles, each tile having: (a) rigid substrate portion that is electrically insulating, having a top side, a bottom side, and at least one edge; (b) a flip-invariant connection point formed on the at least one edge and connected to the microprocessor, wherein the connection point is shaped to mechanically couple with a corresponding connection point on an adjacent tile; (c) a connector junction formed in each connection point for forming electrical contact with an electrically conductive surface of an adjacent tile; and (d) a microprocessor embedded in the substrate that configured to relay information about the tile through the electrical contact, wherein the shape and dimension of the modular tiles and their connection points are each substantially identical from modular tile to modular tile;
a base configured to mechanically attach to at least one modular tile aggregate data from the network of modular tiles and transmit that data via a wireless connection to a computing device;

wherein the base is configured to poll the components of the network of modular tiles to: (a) identify all nodes in the network; and (b) identify all connections, orientations, and spin between modular tiles in the network to populate a data structure than can be transmitted to the computing device for display; and wherein the base is further configured to provide power to the network of modular tiles.

6. The modular virtual modeling system of claim 5 wherein the connector junction is divided into a plurality of segments such that contact between the connector junctions and the connector junction on an adjacent tile facilitates a signal indicating the presence of the connection and the relative position between the tile and an adjacent tile.

7. The modular virtual modeling system of claim 5 wherein the connection point is configured such that mechanical coupling with an adjacent tile permits a single orientation relative to an adjacent tile.

8. The modular virtual modeling system of claim 5 further comprising a plurality of retention features used to enhance a mechanical connection with an adjacent tile.

9. The modular virtual modeling system of claim 5 wherein the rigid substrate portion has a cross section that is one of polygonal, circular, elliptical, triangular, and oblate.

10. The modular virtual modeling system of claim 5 wherein the base is adapted to receive data representing the connections among the network of modular tiles and represent that data in a data structure for transfer to the computing device.

11. The modular virtual modeling system of claim 5 wherein the base is further adapted to communicate a visual representation of the network of modular tiles to the computing device in real time and to adapt to changes in the network of modular tiles as they occur.

12. The modular virtual modeling system of claim 5 wherein the base further comprises a power supply that is used to power the network of modular tiles.

* * * * *